(12) United States Patent
Potocnik

(10) Patent No.: US 12,686,084 B2
(45) Date of Patent: Jul. 21, 2026

---

(54) DEVICE FOR SETTING A SPECIFIC OPERATING POSITION OF AN APPARATUS COMPONENT AND METHOD THEREFOR

(71) Applicant: EVG Entwicklungs-u. Verwertungs-Gesellschaft m.b.H., Raaba (AT)

(72) Inventor: Wolfgang Potocnik, Ilz (AT)

(73) Assignee: EVG Entwicklungs-u. Verwertungs-Gesellschaft m.b.H., Raaba (AT)

( * ) Notice: Subject to any disclaimer, the term of this patent is extended or adjusted under 35 U.S.C. 154(b) by 0 days.

(21) Appl. No.: 18/137,345

(22) Filed: Apr. 20, 2023

(65) Prior Publication Data

US 2023/0347455 A1 Nov. 2, 2023

(30) Foreign Application Priority Data

Apr. 28, 2022 (EP) .................................... 22170568

(51) Int. Cl.
B23K 37/02 (2006.01)

(52) U.S. Cl.
CPC ...... B23K 37/0241 (2013.01); B23K 37/0211 (2013.01)

(58) Field of Classification Search
CPC ......... B23P 15/00; B23P 19/001; B23P 23/00; B23P 21/004; B23P 23/04; B23P 21/00; B23P 19/007; B23P 19/00; B23P 21/006; B23P 23/06; B23P 19/005; B23P 19/02; B23P 19/06; B23P 15/26; B23P 2700/50; B23P 15/003; B23P 15/12; B23P 15/16;

B23P 15/24; B23P 15/34; B23P 19/004; B23P 19/006; B23P 19/027; B23P 19/04; B23P 2700/01; B23K 37/00; B23K 37/0443; B23K 37/047; B23K 31/02; B23K 9/32; B23K 37/0435; B23K 26/702;
(Continued)

(56) References Cited

U.S. PATENT DOCUMENTS 3,405,743 A * 10/1968 Rbinson .................. B21F 27/10
219/56
3,815,890 A * 6/1974 Urban ................ B23K 37/0443
29/897.15
(Continued)

FOREIGN PATENT DOCUMENTS

CN 110394409 B * 4/2020 .............. B21F 27/10
KR 20100020857 A * 2/2010 .............. B21F 27/10

*Primary Examiner* — Keith Walker
*Assistant Examiner* — Carlos J Gamino
(74) *Attorney, Agent, or Firm* — GREENBLUM & BERNSTEIN, P.L.C.

(57) ABSTRACT

A device, use of the device and method for setting a specific operating position of an apparatus component, such as a wire feed of a welding installation. The apparatus component can be moved, in particular linearly displaced, to set the specific operating position and, after being moved into the specific operating position, can be fixed in place in said position for operation. The device includes a positioning element that has a modifiable surface on which the specific operating position can be preset for operation; and a setting aid that comprises at least one region interacting with the modifiable surface of the positioning element, and which is embodied to lie against the apparatus component.

10 Claims, 3 Drawing Sheets

(58) Field of Classification Search

CPC .......................... B23K 26/21; B23K 37/0461; B23K 37/0252; B23K 9/0956; B23K 11/36; B23K 3/08; B23K 9/0953; B23K 2101/36; B23K 3/087; B23K 37/04; B23K 37/0426; B23K 2101/22; B23K 37/003; B23K 3/00; B23K 37/02; B23K 37/053; B23K 26/24; B23K 37/0408; B23K 9/095; B23K 9/16; B23K 1/0008; B23K 11/11; B23K 9/00; B23K 11/002; B23K 20/26; B23K 2101/006; B23K 9/167; B23K 9/173; B23K 10/027; B23K 26/032; B23K 26/082; B23K 31/125; B23K 37/006; B23K 9/28; B23K 2101/06; B23K 2101/42; B23K 26/0884; B23K 26/342; B23K 37/0211; B23K 9/0026; B23K 9/235; B23K 11/314; B23K 15/0046; B23K 2103/14; B23K 37/0247; B23K 37/0258; B23K 9/325; B23K 1/20; B23K 11/02; B23K 15/0093; B23K 20/002; B23K 2101/38; B23K 26/0823; B23K 26/22; B23K 31/00; B23K 31/003; B23K 9/02; B23K 9/044; B23K 9/12; B23K 11/008; B23K 11/31; B23K 15/0053; B23K 15/0086; B23K 26/0648; B23K 26/0876; B23K 26/348; B23K 37/0452; B23K 37/0533; B23K 9/124; B23K 9/127; B23K 9/1274; B23K 11/00; B23K 11/115; B23K 15/0026; B23K 20/02; B23K 2101/18; B23K 26/123; B23K 28/02; B23K 3/04; B23K 9/1062; B23K 9/126; B23K 9/287; B23K 9/322; B23K 11/14; B23K 11/252; B23K 15/0013; B23K 2101/001; B23K 2101/34; B23K 26/0006; B23K 26/0643; B23K 26/0853; B23K 26/32; B23K 26/70; B23K 37/0538; B23K 37/08; B23K 9/042; B23K 9/0731; B23K 9/0737; B23K 9/10; B23K 9/133; B23K 9/23; B23K 9/282; B23K 9/321; B23K 10/006; B23K 10/02; B23K 11/06; B23K 11/24; B23K 15/0033; B23K 15/06; B23K 20/023; B23K 20/10; B23K 20/122; B23K 2101/14; B23K 26/142; B23K 26/16; B23K 26/20; B23K 26/244; B23K 26/60; B23K 3/043; B23K 3/0607; B23K 33/004; B23K 35/383; B23K 37/0229; B23K 37/0282; B23K 9/028; B23K 9/18; B23K 1/002; B23K 1/008; B23K 10/022; B23K 11/241; B23K 11/25; B23K 11/312; B23K 15/006; B23K 20/126; B23K 2101/02; B23K 2101/24; B23K 2101/28; B23K 26/00; B23K 26/03; B23K 26/042; B23K 26/06; B23K 26/0652; B23K 26/0676; B23K 26/26; B23K 26/402; B23K 26/703; B23K 26/706; B23K 3/0475; B23K 31/12; B23K 33/00; B23K 35/0261; B23K 35/308; B23K 9/007; B23K 9/1087; B23K 9/186; B23K 9/285; B23K 9/328; B23K 1/00; B23K 1/0012; B23K 1/0053; B23K 1/08; B23K 1/085; B23K 11/318; B23K 20/026; B23K 20/123; B23K 20/1255; B23K 2101/00; B23K 2101/002; B23K 2101/12; B23K 2101/185; B23K 2103/04; B23K 2103/10; B23K 2103/12; B23K 2103/42; B23K 2103/50; B23K 26/046; B23K 26/048; B23K 26/0626; B23K 26/064; B23K 26/067; B23K 26/08; B23K 26/12; B23K 26/127; B23K 26/14; B23K 26/1462; B23K 26/34; B23K 26/361; B23K 26/38; B23K 28/00; B23K 3/06; B23K 3/0623; B23K 3/063; B23K 3/082; B23K 3/085; B23K 31/006; B23K 31/022; B23K 35/3046; B23K 35/3066; B23K 37/0235; B23K 37/0531; B23K 37/06; B23K 5/00; B23K 5/22; B23K 9/0043; B23K 9/0206; B23K 9/0209; B23K 9/035; B23K 9/067; B23K 9/121; B23K 9/1276; B23K 9/164; B23K 9/1675; B23K 1/0056; B23K 1/19; B23K 1/206; B23K 11/0053; B23K 11/253; B23K 11/26; B23K 11/30; B23K 11/3009; B23K 11/3063; B23K 11/315; B23K 11/34; B23K 20/00; B23K 20/001; B23K 20/1235; B23K 20/1265; B23K 2101/04; B23K 2101/32; B23K 2101/40; B23K 2103/05; B23K 2103/08; B23K 2103/18; B23K 2103/54; B23K 25/00; B23K 26/02; B23K 26/0604; B23K 26/0622; B23K 26/073; B23K 26/083; B23K 26/0869; B23K 26/10; B23K 26/242; B23K 26/28; B23K 26/322; B23K 26/346; B23K 26/362; B23K 26/382; B23K 3/026; B23K 3/047; B23K 3/0638; B23K 35/0227; B23K 35/22; B23K 35/304; B23K 35/32; B23K 37/0264; B23K 37/0294; B23K 9/022; B23K 9/025; B23K 9/0282; B23K 9/0286; B23K 9/0288; B23K 9/04; B23K 9/09; B23K 9/092; B23K 9/1006; B23K 9/1043; B23K 9/1056; B23K 9/125; B23K 9/1735; B23K 9/20; B23K 9/291; B23K 9/30; B23K 9/324

See application file for complete search history.

(56) References Cited

U.S. PATENT DOCUMENTS

| | | | | |
|---|---|---|---|---|
| 5,113,915 A | * | 5/1992 | Ritter | B21F 27/10 |
| | | | | 140/112 |
| 5,142,764 A | * | 9/1992 | Whiteside | B21J 15/142 |
| | | | | 29/897 |
| 5,211,208 A | * | 5/1993 | Ritter | B21F 27/10 |
| | | | | 219/56 |
| 10,315,278 B2 | * | 6/2019 | Wang | B23K 37/0435 |
| 2006/0226127 A1 | * | 10/2006 | Muller | B21F 23/005 |
| | | | | 219/56 |
| 2017/0008065 A1 | * | 1/2017 | Anagnostopoulos | B21F 27/10 |
| 2018/0056364 A1 | * | 3/2018 | Anagnostopoulos | |
| | | | | B23K 37/0435 |

* cited by examiner

DEVICE FOR SETTING A SPECIFIC OPERATING POSITION OF AN APPARATUS COMPONENT AND METHOD THEREFOR

The invention relates to a device for setting a specific operating position of an apparatus component, such as a wire feed of a welding installation, wherein the apparatus component can be moved, in particular linearly displaced, to set the specific operating position and, after being moved into the specific operating position, can be fixed in place in said position for operation.

The invention furthermore relates to a use of a device of this type.

Finally, the invention relates to a method for setting a specific operating position of an apparatus component, such as a wire feed of a welding installation, wherein the apparatus component is moved, in particular linearly displaced, into the specific operating position, and is then fixed in place in the specific operating position for operation.

In production systems that are designed for different products, when changing over to another product that is to be produced it is normally necessary to adapt, or if necessary, even to reconfigure, the production apparatus accordingly. For an efficient fabrication, importance is thereby placed on a corresponding changeover process to another product that is to be fabricated not only being reliable, but also so that it can be carried out as rapidly as possible. The shorter the retooling or adapting times are, the greater the time efficiency with which products can be produced.

One example of this is welding installations which are used to manufacture grating. The grating can be reinforcing steel mesh, mesh for fences, or the like. A fabrication thereby normally takes place in a quasi-continuous manner, wherein longitudinal wires are normally fed to the cross wires and are welded to said cross wires. Here, a bundle of longitudinal wires is respectively welded simultaneously to a single cross wire. The exact geometry is typically specified by a customer, who requires a specific mesh type in terms of the dimensions. Because the batch sizes are rather small, the operator of the welding installation must frequently retool said installation for a new product. This affects the longitudinal wire feeds, which can be linearly displaced transversely to the feed direction of the longitudinal wires, so that a longitudinal wire spacing can be set for a specific mesh type. For this purpose, the longitudinal wire feeds are released from a fixed position and displaced into desired positions. This changeover should take place as rapidly and as accurately as possible.

Since the corresponding retooling times significantly influence the system efficiency, various approaches for enabling a most rapid and accurate retooling possible have already been developed. A first approach is to use automatic actuating units which can be operated electrically, hydraulically, or pneumatically. However, actuating units of this type are relatively costly and susceptible to malfunctions, in particular when optical elements such as lasers, for example, are also necessary for positioning. In addition, actuating units of this type are also relatively susceptible to soiling that inevitably occurs when welding installations are in operation. Yet another problem results due to the fact that even though the actuating units can, in principle, be operated in an automated manner, they require for new geometries an additional programming, which normally involves a high cost.

In another approach, an attempt was made to use optical systems as aids for the positioning of longitudinal wire feeds. As is also the case with solely automated actuating units, the problem of a high sensitivity to soiling occurs. In addition, corresponding sensor systems on a linear axis typically only allow the changeover by a single user, which is a time-limiting factor. If namely two, or possibly even more, people can work on the changeover process at the same time, a corresponding time reduction results.

As a further approach, measuring rails are used, which have proved to be poorly suited, however. With said rails, the personnel must either note or photograph the necessary markings or an additional electronic tool is required which displays on the measuring rail the respective setting position that is to be reached. This is laborious and also requires a relatively high expenditure of time during the changeover.

The object of the invention is to specify a device of the type named at the outset with which the predetermined operating position of an apparatus component that is to be adjusted can be set in a rapid and accurate manner.

A further object of the invention is to describe a use of a device of this type.

Yet another object of the invention is to further develop a method of the type named at the outset such that an apparatus component can be quickly and accurately brought into a desired operating position.

The object of the invention is attained if a device of the type named at the outset comprises the following:

a positioning element that has a modifiable surface on which the specific operating position can be preset for operation;

a setting aid that comprises at least one region interacting with the modifiable surface of the positioning element, and which is embodied to lie against the apparatus component.

One advantage obtained with the invention can in particular be seen in that the apparatus component can be brought into a desired position rapidly and with high accuracy. The apparatus component can, for example, be an apparatus component of a welding installation or welding machine, for example a wire feed, in particular a longitudinal wire feed, but also other components that can be linearly displaced along a straight line and locked in a predetermined position, including welding heads for example. In addition, the concept according to the invention can also be applied to any other desired adjustment purposes in which a longitudinally displaceable apparatus component must first be brought into an operating or target position and then be fixed in place in said position for operation.

In a device according to the invention, the positioning element comprises a modifiable surface. The modifiable surface can be used to indirectly preset a specific operating position on said surface for operation. In other words, the setting for the changeover or retooling of an apparatus component is set on the positioning element. If multiple apparatus components must be changed over, it is, of course, possible to set multiple corresponding operating positions on a single positioning element by modifying the surface. In addition, the device comprises a setting aid, the purpose of which it is to interact in regions with the modifiable surface of the positioning element and to lie against the apparatus component. With the positioning element, the next target or operating position is thus defined, though a changeover merely by sight alone would make this possible. With the setting aid, a connection between the position-determining surface of the positioning element on the one hand and the apparatus component on the other hand is created. Because this can only be a mechanical connection, the predetermined operating position indirectly preset by the positioning element is translated to the apparatus component, or if necessary multiple apparatus components, using the setting aid. For this purpose, the setting aid is preferably embodied such that it can be brought into contact in regions in a force fit and/or form fit with both the positioning element and with the apparatus component.

One advantage obtained with the invention can in particular be seen in that with the setting aid, in particular on welding installations or welding machines, but also in other systems which comprise apparatus components that are designed to be longitudinally displaceable and can be locked or fixed in place for operation along a corresponding longitudinal axis, changeovers are possible in a quick, reliable, and accurate manner. The positioning element can already be prepared while the installation or machine is still being used for the production of a certain product. As soon as a product change occurs, the positioning element can be immediately used for retooling. If there is another change, this is repeated so that, during a running production cycle, the positioning element can be or is already prepared for the next production cycle. In addition, the device has the advantage of reliability, since human error during the changeover process is eliminated, or at least virtually eliminated, in this context due to the geometry of the surface and the setting thereof. Because the modifiable surface presets the operating position(s) and said position(s) are, as it were, transferred to the apparatus component using the setting aid, sources of error are avoided. In addition, the device also delivers accurate results during the changeover, in particular if a force- and/or form-fitting contact is present between the individual elements along the positioning element/setting aid/apparatus component line. Particularly on systems for creating welded mesh, this is also manifested in an extraordinarily high product quality, since fabrication is possible with especially low tolerances. Thus, in addition to a time savings of up to 100%, there also results a visible advantage in the product. Yet another advantage of a device according to the invention is that the device can, as needed, be composed solely of mechanical structural parts that interact with one another, whereby the device is particularly robust.

It is preferably provided that the apparatus component can be brought into the specific operating position by laying the setting aid on the surface and on the apparatus component. For this purpose, the setting aid is embodied such that, when there is contact with the positioning element and therefore a fixing-in-place has already occurred, said setting aid can nevertheless grasp the apparatus component within a certain amount of play. For this reason, the setting aid can be embodied with a conically widened contact region in relation to the apparatus component. When the setting aid is laid in position, the apparatus component, which expediently comprises corresponding surfaces in corresponding regions, then yields while moving into a target or operating position. As a result, the apparatus component can then be fixed in place for further operation.

In principle, it is not necessary that the positioning element be fixed in place on an apparatus which comprises the apparatus components that are to be adjusted; however, a separate region can be provided for this purpose on the apparatus. For the adjustment of the apparatus components being configured, a releasable fixing of the positioning element yields the advantage that positioning errors are avoided. Nevertheless, a releasable attachment of the positioning element is not absolutely necessary in order to perform a setting.

The positioning element can, in principle, have any desired shape. Preferably, the positioning element is embodied to be elongate, since multiple apparatus components must normally be set and changed over, and the respective positions can then be set by length (in accordance with the longitudinal displaceability and the corresponding longitudinal axis for the displacement of the apparatus components). The positioning element is then oriented parallel to the longitudinal axis along which the apparatus components are displaced and configured. For this purpose, the surface of the positioning element is embodied such that it determines a position in a plurality of regions.

The positioning element, which, as mentioned, can be embodied as a rail for example, comprises a modifiable surface for the purposes of defining the operating positions. The surface can, for example, be embodied with a plurality of buttons which can be pressed into the rail against a spring force, in order to thus modify the surface of the rail, or of the positioning element in general. The reverse variant is also possible, namely that individual buttons are mounted in corresponding recesses and can be released from said position so that the buttons project. In principle, any desired mechanical systems can be used that allow the surface of the positioning element to be modified in a manual or, if necessary, also an automated manner such that positions of the apparatus components can be defined using said systems. It is particularly preferred, however, if the positioning element is embodied with a plurality of recesses into which pins protruding out of the surface can be inserted to define at least one specific operating position, preferably a plurality of specific operating positions. In this case, the positions for the apparatuses are preset using the pins. An equipping can thereby occur while the system is operating, so that a change can take place immediately using the re-equipped positioning element during the product change. Another, different variant is that the positioning element comprises a plurality of variably activatable recesses via which the position(s) are preset in a position-determining manner and the setting aid is embodied with pins that engage, or projections in general, which can engage in the activated recesses.

The necessary setting aid is embodied to be as simple as possible. Preferably, the setting aid comprises a handle so that the setting aid can be rapidly actuated.

The setting aid can comprise an in particular elongate base body, the bottom side of which can be laid against the apparatus component and the positioning element in regions. Specifically, the base body can then be arranged below the handle so that the setting aid can be fitted onto the positioning element and the apparatus component. For this purpose, a bottom side of the setting aid can comprise conically diverging surfaces to which conically converging surfaces of the apparatus component correspond. As a result, the apparatus component, which is designed to be releasable and therefore longitudinally displaceable for setting the operating position, automatically engages and is thus brought into the target or operating position in which it is then fixed in place for operation.

The base body of the setting aid can, in side view, be present as a longitudinally embodied body with a connecting, preferably perpendicularly connecting, angle piece. The handle is then mounted at the head end. The angle piece is used to engage with the positioning element, whereas the longitudinally designed part of the base body can be brought into engagement with the apparatus component. In each case, a force- and/or form-fitting contact occurs, preferably a form fit in regions. An opening for feeding a tool through can be provided in the angle piece.

The positioning element and the setting aid are preferably present such that they are separate from one another. The setting aid can, as explained, be embodied as a manually easy-to-handle part with a handle. The positioning element, on the other hand, comprises a modifiable surface and normally needs to be adapted for the subsequent production process.

Even though a device according to the invention can, in principle, be used in any desired application, as soon as one or more apparatus components that are arranged along a longitudinal axis are to be brought into a certain longitudinal position for a production process, a preferred use results for a welding installation for wire grating. In this context, wire grating is to be understood generally; specifically, all products made of welded longitudinal wires and cross wires are included. In particular, the device is suitable for setting wire feeds, especially longitudinal wire feeds.

In accordance with the presented advantages, the invention relates in a further aspect to an apparatus, in particular a welding installation, that comprises a device according to the invention. For a welding installation there results, with a corresponding device, the advantage that a quick, reliable, and accurate retooling can take place for a subsequent product, for example reinforcing steel mesh with different longitudinal partitioning. Also, multiple people can simultaneously perform the changeover, which can constitute an added time savings.

The method-related object of the invention is attained if, with a method of the type named at the outset, a modifiable surface of a positioning element is set to the specific operating position for operation and a setting aid is laid against the modifiable surface of the positioning element and the apparatus component, so that the apparatus component is moved into the operating position.

The positioning element can be fixed in place, in particular releasably fixed in place, prior to the movement of the apparatus component. For this purpose, the positioning element can be releasably arranged on the apparatus using corresponding fasteners.

It is particularly preferred that one force fit and/or form fit each is produced between the positioning element and the setting aid and between the setting aid and the apparatus component. In particular, it can be sufficient to produce one form fit each. Via the form fit, a quick and accurate setting of the apparatus component in the desired operating position can be achieved.

Additional features, advantages, and effects of the invention follow from the exemplary embodiments described below. In the drawings which are thereby referenced:

Figures 1, 2, 3, 4, 5:
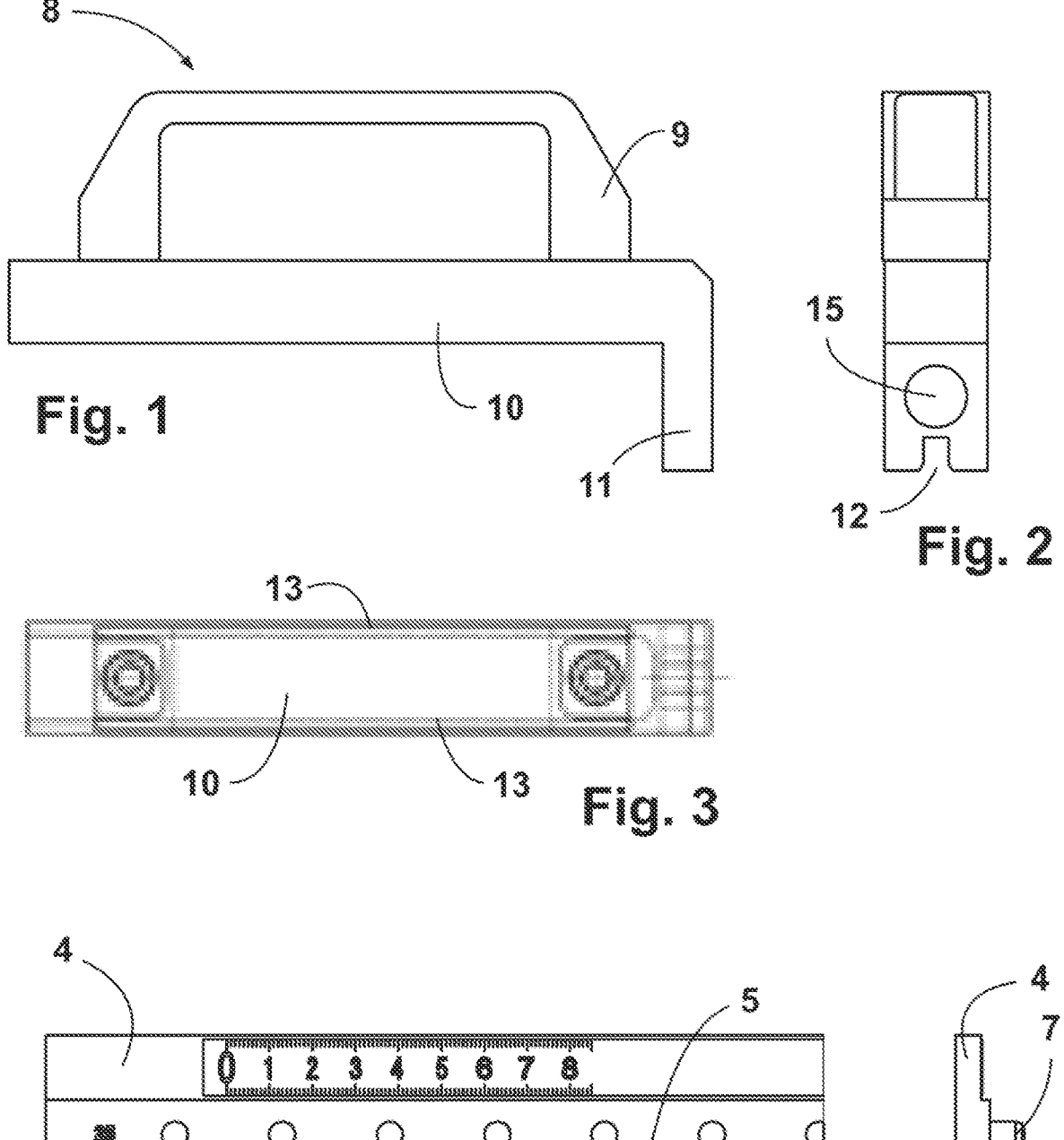
FIG. 1 shows a side view of a setting aid.
FIG. 2 shows a front-end view of the setting aid from FIG. 1.
FIG. 3 shows a bottom view of the setting aid from FIG. 1.
FIG. 4 shows a detail of a positioning element.
FIG. 5 shows a side view of the positioning element from FIG. 4.

In FIG. 1 through FIG. 8, a first embodiment of the invention is illustrated. In FIG. 1 through FIG. 5, a device 1 according to the invention can be seen. The device 1 comprises a setting aid 8, which is illustrated in FIG. 1 through FIG. 3, and a positioning element 4, which is illustrated in FIG. 4 and FIG. 5.

According to FIG. 1 through FIG. 3, the setting aid 8 has a two-part design. At the head end, the setting aid 8 comprises a handle 9 with which the setting aid 8 can be easily gripped by a user. A base body 10 is arranged below the handle 9. The base body 10 is screwed to the handle 9, for example, as can be seen in the bottom view in FIG. 3. The base body 10 is embodied to be elongate and comprises at one end an angled end piece 11. At an end, the end piece 11 is embodied with a notch 12 that can be seen in FIG. 2, and the function of which will be explained below. Furthermore, an opening 15 for feeding a tool through can be provided, in particular to be able to fix an apparatus component 2 in place in an operating position.

On the bottom side, the elongate base body 10 is embodied on the inside with beveled surfaces or bevels 13. These beveled surfaces conically converge towards the handle 9.

The setting aid 8 is embodied to interact with the positioning element 4 visible in FIG. 4 and FIG. 5. The positioning element 4 can, as illustrated, be embodied as rail, wherein in FIG. 4 only a portion of the longer rail is illustrated. The rail normally extends over the region in which a setting of apparatus components 2 using the device 1 according to the invention is necessary. For example, the rail can have a length of multiple meters.

As is illustrated in FIG. 4, the positioning element 4 or the rail comprises a modifiable surface 5. The modifiability of the surface 5 results from the rail being embodied with a plurality of recesses 6 into which pins 7 can be inserted. In principle, other means that are suited to being inserted into the recesses 6 can also be used in place of pins 7.

The positioning element 4 or the rail can, as illustrated, comprise multiple rows of recesses 6 that can be equipped with pins 7 or other means. This can be utilized, for example, to be able to set different longitudinal partitions. In principle, however, it is sufficient if one row of recesses 6 that can be equipped with pins 7 is already present. It is also possible, as can be seen in FIG. 4, that one or more measuring rails are in addition provided which can be additionally useful during setting.

Figure 6:
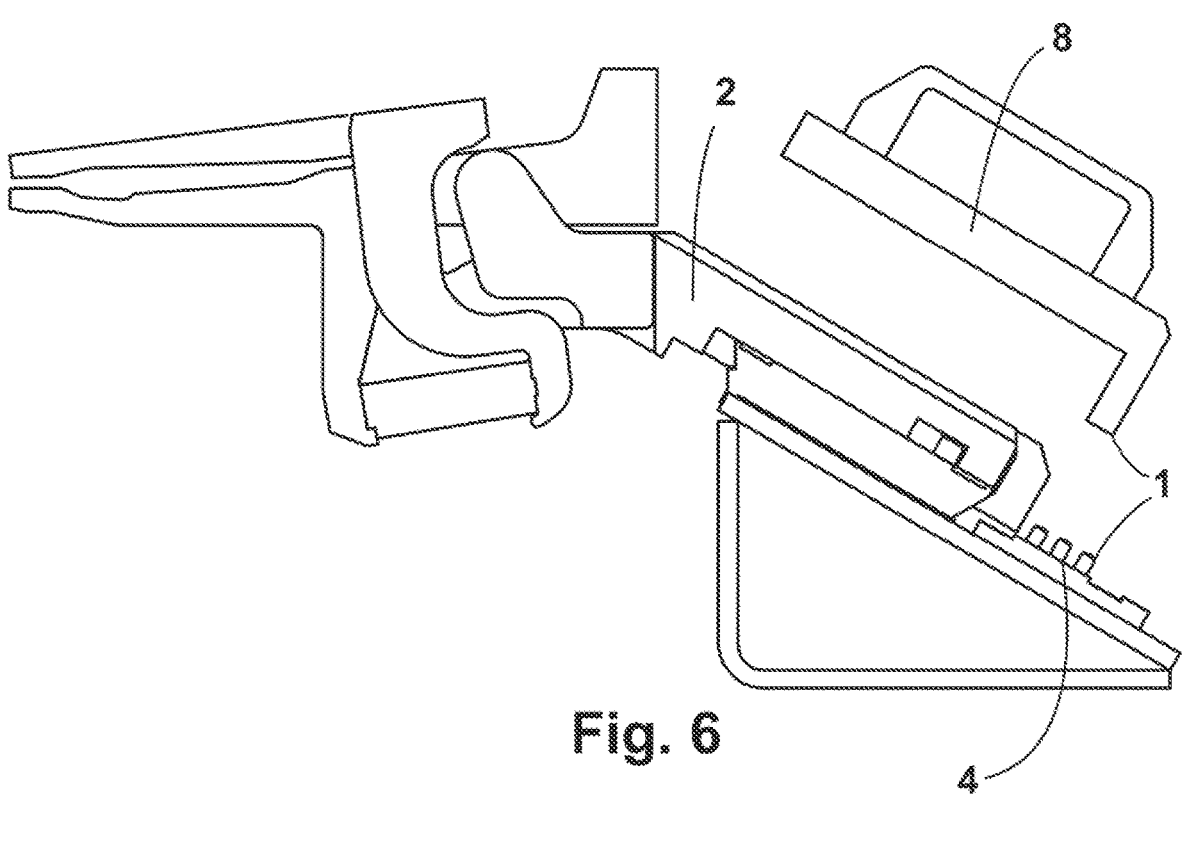
FIG. 6 shows a portion of a welding installation with a mounted positioning element and setting aid during a positioning process.
Figure 7:
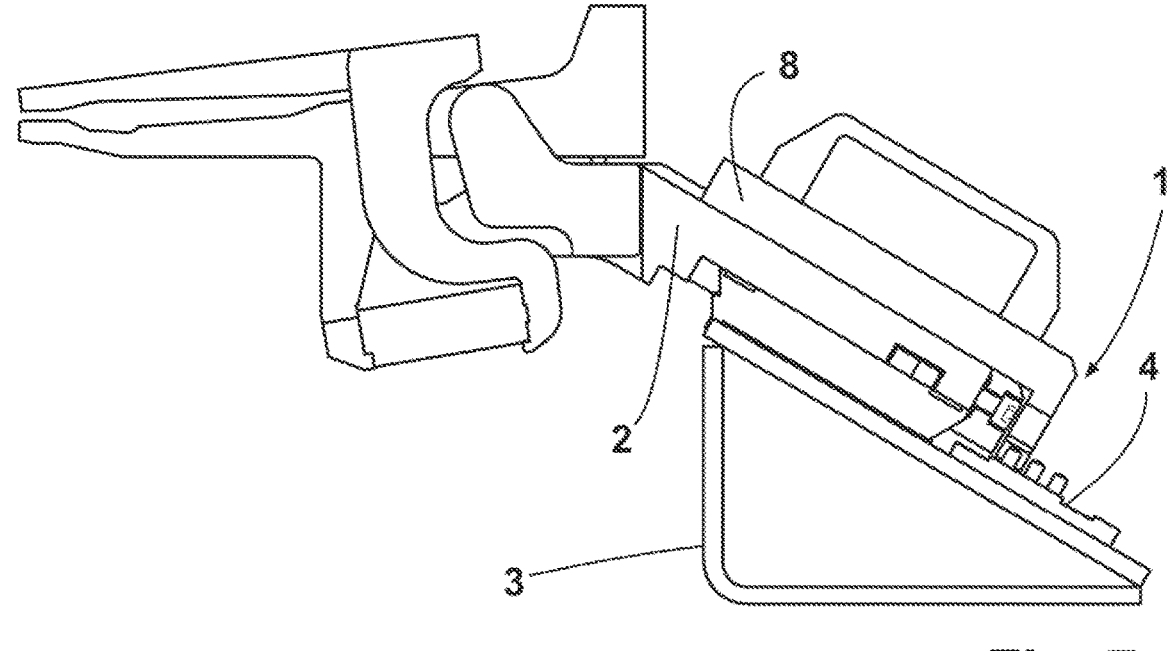
FIG. 7 shows the situation according to FIG. 6 during the positioning process with a fitted setting aid.
Figure 8:
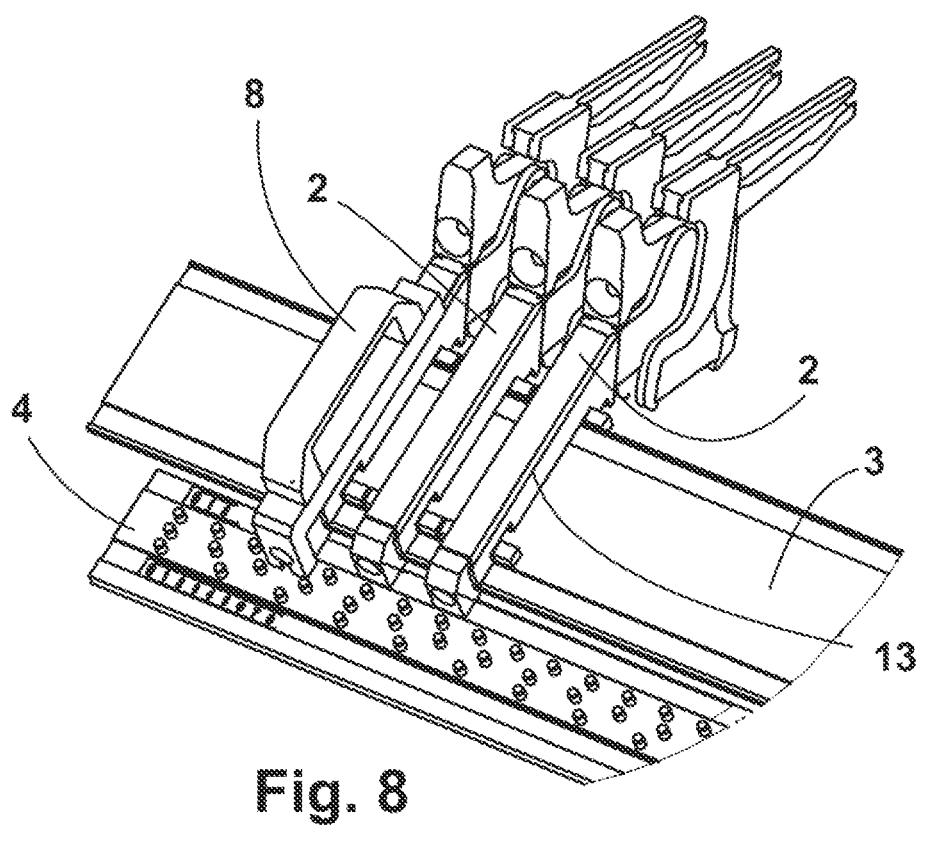
FIG. 8 shows a portion of a welding installation with multiple apparatus components in the form of wire feeds and a fitted setting aid.
Figure 9:
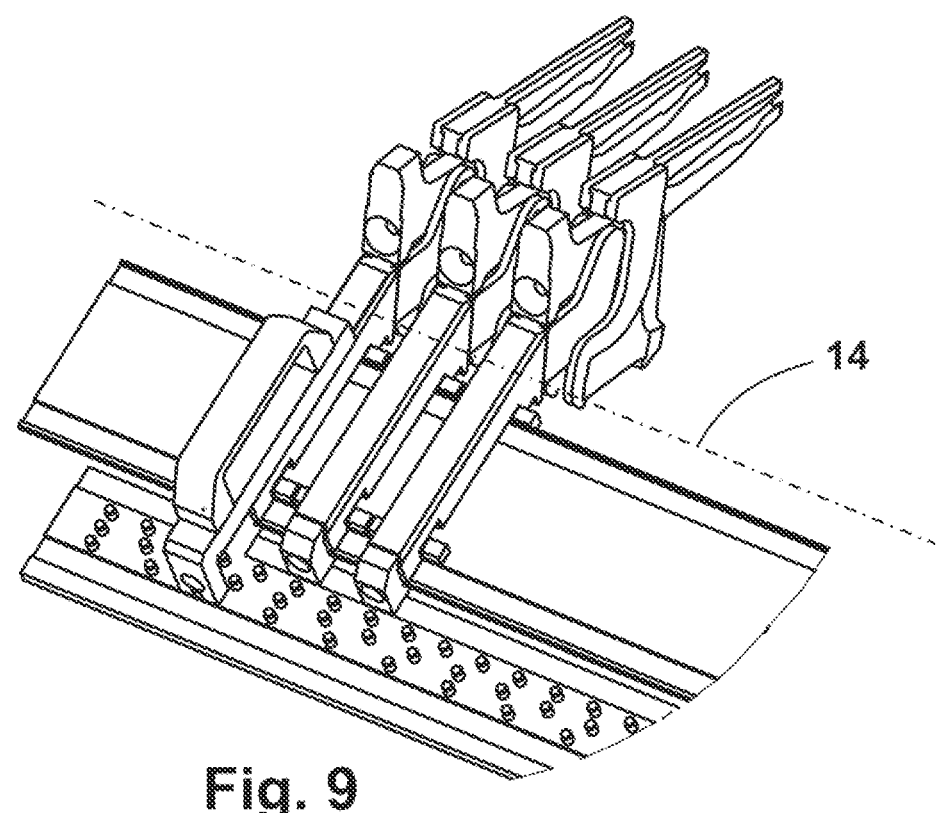
FIG. 9 shows the situation according to FIG. 8 with a different setting.

With the aid of FIG. 6 through FIG. 9, the operating principle of the device 1 according to the invention during a setting of longitudinal wire feeds of a welding installation 3 is explained in greater detail. In FIG. 6 and FIG. 7, a portion of a welding installation 3 is illustrated in side view. Visible is an apparatus component 2, which in this case is constituted by a longitudinal wire feed. Behind the image plane, a plurality of longitudinal wire feeds of this type is present, as can be seen by way of example in FIG. 8 or FIG. 9. With the longitudinal wire feeds, longitudinal wire is fed during the production of a grating, which longitudinal wire is welded to cross wires. For this purpose, it is necessary, depending on the geometry of the grating, that the longitudinal wire feeds be set such that they are partitioned appropriately on a straight line. The longitudinal wire feeds are releasably attached for this purpose. For the process of setting an operating position, the longitudinal wire feeds can be released from a locked operating position and moved into the desired new operating position. To make this as easy as possible, each longitudinal wire feed is preferably attached with only one fastener, such as a screw. The longitudinal wire feed can then be rapidly released, displaced into the desired operating position, and fixed in place in said position. If a different apparatus component 2 is to be set correspondingly, this applies analogously.

If it is necessary to change over to a different grating geometry, the position of the longitudinal wire feeds must be altered. For this purpose, the longitudinal wire feeds are released so that they can be displaced along a longitudinal axis 14 that runs transversely to the feed direction of the longitudinal wire. According to the invention, a setting then takes place using the device 1 designed therefor, with the positioning element 4 and the setting aid 8. For this purpose, the positioning element 4 is arranged or releasably fixed in place parallel to the longitudinal axis 14 on the welding installation 3. The target positions for the predetermined operating position are indirectly preset on the positioning element 4 by pins 7 set correspondingly. The setting aid 8 with the notch 12 is then fitted onto the positioning element 4 and the longitudinal wire feed that is to be set. In the region of the notch 12, the setting aid 8 thereby grasps the corresponding pin 7 in a form fit on the positioning rail. At the same time, or with a time delay, the setting aid 8 is fitted onto the released apparatus component 2 in the form of the longitudinal wire feed, so that a form fit results in the interaction of the setting aid 8 with both the positioning element 4, or the rail, and the longitudinal wire feed. Particularly in relation to the longitudinal wire feed, this is also facilitated in that the longitudinal wire feed comprises beveled surfaces that correspond to those on the inside of the setting aid 8. As a result, the desired displacement of the longitudinal wire feed into the target position or predetermined operating position occurs at the same time. In said position, the longitudinal wire feed element can be fixed in place for the next operation. During said operation, the positioning element 4 or the rail can then already be prepared for the next production run after that. It is also possible to work with multiple rails, so that a first rail initially still remains on the welding installation 3 while the other, second rail is set for the next production run. Then, as soon as a retooling needs to occur, the rails are switched. Additional time can thereby be saved. With multiple setting aids 8, multiple people can also simultaneously perform the changeover.

In the first embodiment, the means necessary for setting the operating position of the individual longitudinal wire feeds are solely mechanical in nature, and do not require any energization or drive means. In a second embodiment, however, a semi-automatic operation is also possible. For this purpose, the positioning element 4 can be embodied such that the surface can be modified in an automated manner, for example by a suitable actuation of pins 7 that can be extended as needed. Though this variant is somewhat more complex and requires more mechanical effort to actuate the individual pins 7 or other suitable means for modifying the surface, it offers the advantage that the positioning element 4 can permanently remain on the apparatus, or on the welding installation 3 in the exemplary embodiment. It is also possible that the positioning element 4 is correspondingly integrated into the welding installation 3. Another advantage results in that it is in this case also possible to digitally input the customer requirements or a specific grating profile and, on the basis of a corresponding dataset, to actuate the positioning element 4 accordingly or to form the surface in a correspondingly suitable manner. A manual setting can then once again take place by means of the setting aid 8.

In a third embodiment, the device 1 according to the invention can operate in a fully automated manner. In this case, the positioning element 4 is set in an automated manner, and the setting aid 8 is also operated automatically. For this purpose, the setting aid 8 can be mounted such that it can be displaced along the longitudinal axis 14. For a positioning in relation to the surface of the positioning element 4 on the one hand and the apparatus component 2 that is to be displaced, suitable optical sensors can be provided. A positioning based on magnetic or electrical fields is also possible in this case.

Even though the second, semi-automated embodiment and the third, fully automated embodiment constitute possible alternatives, the first embodiment with the manual actuation has proven robust and particularly practicable during operation. In addition, along with a minimized error rate, there is also no maintenance requirement, which speaks for the merits of this embodiment.

The invention claimed is:

1. A device for setting a specific operating position from among different operating positions, the specific operating position being a fixed position of an apparatus component for a wire feed of a welding installation, wherein the apparatus component can be moved to set the specific operating position and, after being moved into the specific operating position, can be fixed in place in the specific operating position, wherein the device comprises:

a positioning element that has a modifiable surface on which the specific operating position can be preset for operation using a plurality of pins, wherein the positioning element comprises a plurality of recesses into which the pins are inserted such that the pins protrude out of the modifiable surface to provide the different operating positions; and a setting aid that comprises an elongated base body interacting with the modifiable surface of the positioning element, and which is configured to lie against the apparatus component.

2. The device according to claim 1, wherein the apparatus component can be brought into the specific operating position by laying the setting aid on the modifiable surface and on the apparatus component.

3. The device according to claim 1, wherein the positioning element is configured to be releasably attached to the apparatus component.

4. The device according to claim 1, wherein the positioning element comprises a rail.

5. The device according to claim 1, wherein the specific operating position can be selectively defined on the positioning element.

6. The device according to claim 1, wherein the setting aid comprises a handle.

7. The device according to claim 6, wherein the elongated base body has a bottom side which can be laid against the apparatus component and the positioning element.

8. The device according to claim 1, wherein the positioning element and the setting aid are separate from one another.

9. The device according to claim 1, wherein the elongated base body has an angled end piece that extends at an angle relative to the modifiable surface, and wherein the angled end piece includes a notch that is configured to receive a corresponding one of the pins.

10. A welding installation, comprising the device according to claim 1.

* * * * *